United States Patent
Bacallao

(10) Patent No.: US 10,266,195 B2
(45) Date of Patent: Apr. 23, 2019

(54) SHOPPING CART BAGGING STATION AND METHOD OF FORMING THE SAME

(71) Applicant: Walmart Apollo, LLC, Bentonville, AR (US)

(72) Inventor: Yurgis Mauro Bacallao, Centerton, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 67 days.

(21) Appl. No.: 15/383,126

(22) Filed: Dec. 19, 2016

(65) Prior Publication Data

US 2017/0174239 A1   Jun. 22, 2017

Related U.S. Application Data

(60) Provisional application No. 62/402,475, filed on Sep. 30, 2016, provisional application No. 62/377,135,
(Continued)

(51) Int. Cl.
*B62B 3/10*      (2006.01)
*A47F 9/04*      (2006.01)
(Continued)

(52) U.S. Cl.
CPC .............. *B62B 3/106* (2013.01); *A47F 9/042* (2013.01); *B62B 3/1464* (2013.01); *B65B 67/1227* (2013.01); *B65B 67/1266* (2013.01)

(58) Field of Classification Search
CPC ... B62B 3/106; B62B 3/1464; B62B 67/1227; B62B 67/1266; A47F 9/042
See application file for complete search history.

(56) References Cited

U.S. PATENT DOCUMENTS 259,932 A   6/1882   Sims
370,563 A   9/1887   Simmons
(Continued)

FOREIGN PATENT DOCUMENTS

AU   1142402 A1   4/2002
AU   2002364902 A1   5/2004
(Continued)

OTHER PUBLICATIONS

Search Report in GB Patent Application No. GB1713283.8, dated Dec. 22, 2017; 4 pages.
(Continued)

*Primary Examiner* — Corey N Skurdal
(74) *Attorney, Agent, or Firm* — Schmeiser, Olsen & Watts LLP

(57) ABSTRACT

Described is a shopping cart bagging station that couples to a shopping cart. Customers can use the shopping cart bagging station to bag their purchases as they shop. The disclosed shopping cart bagging station includes a bag dispenser portion and a first and a second mounting clip. The bag dispenser portion holds a plurality of shopping bags, and dispenses the shopping bags one at a time as products are placed in the shopping bag. The first and the second mounting clip are coupled to the bag dispenser portion and couple the shopping cart bagging station to a shopping cart. The shopping cart bagging station can be mounted in various locations on a shopping cart, making it easy and convenient for a customer to carry and load a plurality of shopping bags as they shop.

12 Claims, 7 Drawing Sheets

Related U.S. Application Data filed on Aug. 19, 2016, provisional application No. 62/377,143, filed on Aug. 19, 2016, provisional application No. 62/298,017, filed on Feb. 22, 2016, provisional application No. 62/298,011, filed on Feb. 22, 2016, provisional application No. 62/270,813, filed on Dec. 22, 2015, provisional application No. 62/270,785, filed on Dec. 22, 2015, provisional application No. 62/270,827, filed on Dec. 22, 2015.

(51) Int. Cl.
*B62B 3/14* (2006.01)
*B65B 67/12* (2006.01)

(56) References Cited

U.S. PATENT DOCUMENTS

| | | | |
|---|---|---|---|
| 562,229 A | 6/1896 | Lenney | |
| 635,100 A | 10/1899 | Huebel | |
| 765,388 A | 7/1904 | Lanpher | |
| 797,871 A | 8/1905 | Smith | |
| 809,568 A | 1/1906 | Hulburt | |
| 873,188 A | 12/1907 | Thumann | |
| 890,693 A | 6/1908 | McCoy | |
| 893,930 A | 7/1908 | Lederman | |
| 896,443 A | 8/1908 | Dyett | |
| 936,736 A | 10/1909 | Porter et al. | |
| 995,798 A | 6/1911 | McCullough | |
| 1,055,745 A | 3/1913 | Harrison | |
| 1,069,108 A | 8/1913 | Buhl | |
| 1,252,740 A | 1/1918 | Thornblade | |
| 1,284,579 A | 11/1918 | Brown | |
| 1,653,393 A | 12/1927 | Cox | |
| 1,662,140 A | 3/1928 | Whitesides | |
| 2,240,629 A | 5/1941 | Smith | |
| 2,305,863 A | 12/1942 | Ginter | |
| 2,498,446 A | 2/1950 | Pawsat | |
| 2,563,679 A | 8/1951 | Hardy | |
| 2,603,438 A | 7/1952 | Adams | |
| 2,682,956 A | 7/1954 | Pike | |
| 2,797,058 A | 6/1957 | Packham | |
| 2,998,955 A | 9/1961 | Hertzog | |
| 3,133,660 A | 5/1964 | Roberts | |
| 3,266,742 A | 8/1966 | Pena | |
| 3,313,504 A | 4/1967 | Thorkild | |
| 3,339,745 A | 9/1967 | Sugerman | |
| D209,279 S | 11/1967 | Cohen | |
| 3,438,644 A | 4/1969 | Kaplan et al. | |
| 3,475,067 A | 10/1969 | Girard | |
| 3,747,298 A | 7/1973 | Lieberman | |
| 3,930,696 A | 1/1976 | Hight et al. | |
| 3,943,859 A | 3/1976 | Boone | |
| 3,995,803 A | 12/1976 | Uitz | |
| 4,048,754 A | 9/1977 | Laux | |
| 4,082,939 A | 4/1978 | Walters | |
| 4,106,617 A | 8/1978 | Boone | |
| 4,269,336 A | 5/1981 | Humlong | |
| 4,305,558 A | 12/1981 | Baker | |
| 4,354,643 A | 10/1982 | Kenner | |
| 4,367,819 A | 1/1983 | Lewis | |
| 4,376,502 A | 3/1983 | Cohen | |
| 4,403,807 A * | 9/1983 | Wilkinson | B62B 3/144 |
| | | | 108/47 |
| 4,456,125 A | 6/1984 | Chap | |
| 4,480,810 A | 11/1984 | Hall | |
| 4,576,388 A | 3/1986 | Pope | |
| 4,583,753 A * | 4/1986 | Economy | B62B 3/1428 |
| | | | 224/411 |
| 4,595,153 A | 6/1986 | Goetz | |
| 4,655,409 A | 4/1987 | Lima | |
| 4,682,782 A | 7/1987 | Mills | |
| 4,702,402 A | 10/1987 | Ferri | |
| 4,728,070 A | 3/1988 | Engelbrecht | |
| 4,838,504 A | 6/1989 | Bittenbinder | |
| D302,062 S | 7/1989 | Sable | |
| 4,881,577 A | 11/1989 | Stroh et al. | |
| 4,881,706 A | 11/1989 | Sedlik | |
| 4,968,047 A | 11/1990 | Ferris | |
| 4,974,799 A | 12/1990 | Palmer | |
| 4,997,149 A | 3/1991 | Koch | |
| 4,998,647 A | 3/1991 | Sharp | |
| 4,998,694 A * | 3/1991 | Barteaux | B65B 67/1216 |
| | | | 248/100 |
| 5,002,215 A | 3/1991 | Gregoire | |
| 5,005,791 A | 4/1991 | Lanzen | |
| 5,190,253 A | 3/1993 | Sable | |
| 5,362,077 A | 11/1994 | Adamson | |
| 5,366,123 A * | 11/1994 | Range | B62B 3/144 |
| | | | 224/411 |
| 5,385,318 A | 1/1995 | Rizzuto | |
| 5,390,443 A | 2/1995 | Emalfarb et al. | |
| 5,427,288 A | 6/1995 | Trubee | |
| 5,437,346 A | 8/1995 | Dumont | |
| 5,439,120 A * | 8/1995 | Brozak | A47F 5/0838 |
| | | | 206/806 |
| 5,443,173 A | 8/1995 | Emery et al. | |
| D363,208 S | 10/1995 | Seidel | |
| 5,460,279 A | 10/1995 | Emery et al. | |
| 5,465,846 A | 11/1995 | Blyth et al. | |
| 5,503,297 A | 4/1996 | Frankel | |
| 5,513,823 A | 5/1996 | Bresnahan | |
| 5,531,366 A | 7/1996 | Strom | |
| 5,533,361 A | 7/1996 | Halpern | |
| 5,564,566 A | 10/1996 | Lamb | |
| 5,618,008 A | 4/1997 | Dearwester et al. | |
| 5,636,818 A | 6/1997 | Edwards et al. | |
| 5,704,497 A | 1/1998 | Wyatt | |
| 5,727,721 A | 3/1998 | Guido et al. | |
| D396,372 S | 7/1998 | Goodman | |
| 5,836,486 A | 11/1998 | Ohsugi | |
| 5,875,902 A | 3/1999 | Emery et al. | |
| D412,080 S | 7/1999 | Emery et al. | |
| 6,018,397 A | 1/2000 | Cloutier et al. | |
| 6,041,945 A | 3/2000 | Faraj | |
| 6,086,023 A | 7/2000 | Kerr et al. | |
| 6,109,462 A | 8/2000 | Emalfarb et al. | |
| 6,152,408 A | 11/2000 | O'Grady | |
| 6,155,521 A | 12/2000 | O'hanlon | |
| 6,170,679 B1 | 1/2001 | Frye | |
| 6,193,265 B1 | 2/2001 | Yemini | |
| 6,299,001 B1 | 10/2001 | Frolov et al. | |
| 6,305,572 B1 | 10/2001 | Daniels et al. | |
| D452,944 S | 1/2002 | Schmidt | |
| 6,341,704 B1 | 1/2002 | Michel, Jr. | |
| 6,364,266 B1 | 4/2002 | Garvin | |
| 6,390,422 B2 | 5/2002 | Banko | |
| 6,409,031 B1 | 6/2002 | Wynne | |
| D459,979 S | 7/2002 | Goodman | |
| 6,481,583 B1 | 11/2002 | Black et al. | |
| 6,543,638 B2 | 4/2003 | Wile | |
| 6,561,403 B1 | 5/2003 | Kannankeril et al. | |
| 6,601,759 B2 | 8/2003 | Fife et al. | |
| 6,606,411 B1 | 8/2003 | Loui et al. | |
| 6,607,229 B1 | 8/2003 | McIntosh | |
| 6,648,265 B2 | 11/2003 | Goldberg | |
| 6,655,537 B1 | 12/2003 | Lang et al. | |
| 6,685,075 B1 | 2/2004 | Kannankeril | |
| 6,726,145 B1 | 4/2004 | Kraus | |
| 6,726,156 B1 | 4/2004 | Scola | |
| D490,691 S | 6/2004 | Buss et al. | |
| 6,745,186 B1 | 6/2004 | Testa et al. | |
| 6,789,687 B2 | 9/2004 | Cramer | |
| 6,805,271 B2 | 10/2004 | Holden | |
| 6,810,149 B1 | 10/2004 | Squilla et al. | |
| 6,832,739 B1 | 12/2004 | Kraus | |
| 6,886,101 B2 | 4/2005 | Glazer et al. | |
| 6,937,989 B2 | 8/2005 | Mcintyre et al. | |
| 7,066,389 B2 | 6/2006 | Dickover et al. | |
| 7,077,612 B1 | 7/2006 | Giggle, III et al. | |
| 7,128,251 B1 | 10/2006 | Galle | |
| 7,172,092 B2 | 2/2007 | Yang et al. | |
| 7,177,820 B2 | 2/2007 | Mcintyre et al. | |
| 7,182,210 B2 | 2/2007 | Metcalf | |
| 7,192,035 B1 | 3/2007 | Lioce | |

(56) References Cited

U.S. PATENT DOCUMENTS

| | | |
|---|---|---|
| D540,591 S | 4/2007 | Snell |
| 7,222,363 B2 | 5/2007 | Rice et al. |
| D552,901 S | 10/2007 | Wilfong, Jr. et al. |
| D571,518 S | 6/2008 | Waldman |
| D575,973 S | 9/2008 | Goodman et al. |
| 7,431,208 B2 | 10/2008 | Feldman et al. |
| 7,475,885 B2 | 1/2009 | Kovath |
| 7,530,537 B2 | 5/2009 | Kandah |
| 7,587,756 B2 | 9/2009 | Peart et al. |
| 7,610,717 B2 | 11/2009 | Luken et al. |
| 7,654,409 B2 | 2/2010 | Hoffman |
| 7,716,064 B2 | 5/2010 | Mcintyre et al. |
| D616,680 S | 6/2010 | Snider |
| 7,789,248 B1 | 9/2010 | Salerno et al. |
| 7,850,014 B2 | 12/2010 | Nguyen et al. |
| 7,887,068 B2 | 2/2011 | Ferguson |
| 8,002,127 B2 | 8/2011 | Ward et al. |
| 8,069,092 B2 | 11/2011 | Bryant |
| D650,209 S | 12/2011 | Snider |
| D654,737 S | 2/2012 | Guindi |
| 8,177,079 B2 | 5/2012 | Schwartzkopf et al. |
| D666,858 S | 9/2012 | Goodman |
| D667,250 S | 9/2012 | Goodman et al. |
| 8,292,094 B2 | 10/2012 | Morton |
| 8,336,800 B1 | 12/2012 | Lopez |
| D689,282 S | 9/2013 | Lindeman |
| 8,572,712 B2 | 10/2013 | Rice et al. |
| D693,577 S | 11/2013 | Goodman et al. |
| 8,640,890 B2 | 2/2014 | Schiller |
| 8,668,207 B1 * | 3/2014 | Gilliam .................. G09F 23/06 |
| | | 280/33.992 |
| 8,746,640 B2 | 6/2014 | Broadley et al. |
| 8,814,039 B2 | 8/2014 | Bishop et al. |
| D713,663 S | 9/2014 | Pryor |
| 8,820,633 B2 | 9/2014 | Bishop et al. |
| 8,851,369 B2 | 10/2014 | Bishop et al. |
| D718,054 S | 11/2014 | Goodman et al. |
| D719,372 S | 12/2014 | Goodman et al. |
| 8,905,411 B1 | 12/2014 | Blanton |
| D720,538 S | 1/2015 | Goodman et al. |
| D728,255 S | 5/2015 | Guindi et al. |
| 9,199,656 B1 | 12/2015 | Tong et al. |
| D746,592 S | 1/2016 | Goodman et al. |
| D747,876 S | 1/2016 | Goodman et al. |
| D750,472 S | 3/2016 | Kuka |
| D751,763 S | 3/2016 | Goodman et al. |
| D784,721 S | 4/2017 | Goodman et al. |
| 9,623,995 B2 | 4/2017 | Tan |
| D785,333 S | 5/2017 | Goodman et al. |
| D785,369 S | 5/2017 | Goodman et al. |
| D787,303 S | 5/2017 | Garvin |
| 9,656,827 B2 | 5/2017 | Sudhir |
| 9,694,840 B2 | 7/2017 | Hendrick et al. |
| 9,737,141 B2 | 8/2017 | Johnson |
| D796,771 S | 9/2017 | Bacallao et al. |
| D803,032 S | 11/2017 | Jammehdiabadi |
| 9,844,283 B2 | 12/2017 | Bacallao |
| 2002/0145086 A1 | 10/2002 | Alvarado et al. |
| 2002/0170937 A1 | 11/2002 | Yeh et al. |
| 2002/0185510 A1 | 12/2002 | Holsclaw |
| 2002/0185513 A1 | 12/2002 | Morris |
| 2003/0000905 A1 | 1/2003 | Zidek |
| 2003/0042694 A1 | 3/2003 | Werner |
| 2003/0052464 A1 | 3/2003 | McGuire |
| 2003/0098326 A1 | 5/2003 | Wile |
| 2003/0121871 A1 | 7/2003 | Zadro |
| 2003/0198390 A1 | 10/2003 | Loui et al. |
| 2004/0000529 A1 | 1/2004 | Gladnick et al. |
| 2004/0000612 A1 | 1/2004 | Young |
| 2004/0075015 A1 | 4/2004 | Cain et al. |
| 2004/0124598 A1 | 7/2004 | Williams |
| 2004/0139398 A1 | 7/2004 | Testa et al. |
| 2004/0178298 A1 | 9/2004 | Kennard |
| 2004/0262385 A1 * | 12/2004 | Blaeuer .............. B62B 3/1408 |
| | | 235/383 |
| 2005/0056718 A1 | 3/2005 | Kamenstein |
| 2005/0205578 A1 | 9/2005 | Yeh |
| 2005/0284729 A1 | 12/2005 | LoRusso |
| 2006/0049591 A1 | 3/2006 | Pennell |
| 2006/0097467 A1 | 5/2006 | Solomon et al. |
| 2006/0124799 A1 | 6/2006 | Johnson |
| 2006/0226187 A1 | 10/2006 | Linker |
| 2007/0095769 A1 | 5/2007 | Jenkins |
| 2007/0176058 A1 | 8/2007 | Kohn |
| 2007/0186515 A1 | 8/2007 | Ruetten et al. |
| 2007/0204044 A1 | 8/2007 | Rice et al. |
| 2007/0261159 A1 | 11/2007 | Marks |
| 2007/0278359 A1 | 12/2007 | Kandah |
| 2008/0000910 A1 | 1/2008 | Gaillard |
| 2008/0001019 A1 | 1/2008 | Brown |
| 2008/0169253 A1 | 7/2008 | Vitale |
| 2008/0202851 A1 | 8/2008 | Schwenke et al. |
| 2008/0215448 A1 | 9/2008 | Boyle et al. |
| 2008/0215449 A1 | 9/2008 | Boyle et al. |
| 2008/0217342 A1 | 9/2008 | Cinque |
| 2008/0245684 A1 | 10/2008 | Yeatman |
| 2009/0078731 A1 * | 3/2009 | Yi .......................... A45C 3/04 |
| | | 224/411 |
| 2009/0078815 A1 | 3/2009 | Tong et al. |
| 2009/0092342 A1 | 4/2009 | Rolim de Oliveira |
| 2009/0184162 A1 | 7/2009 | Rice et al. |
| 2009/0261050 A1 | 10/2009 | Curren |
| 2009/0319352 A1 | 12/2009 | Boyle et al. |
| 2009/0327087 A1 | 12/2009 | Beck et al. |
| 2010/0096514 A1 | 4/2010 | Adair et al. |
| 2010/0102014 A1 | 4/2010 | Yang |
| 2010/0123050 A1 | 5/2010 | Astwood |
| 2010/0148019 A1 | 6/2010 | Simhaee |
| 2010/0206825 A1 | 8/2010 | Johnston et al. |
| 2010/0219219 A1 | 9/2010 | Svetina |
| 2010/0264101 A1 | 10/2010 | Ma |
| 2011/0266092 A1 | 11/2011 | Marquis et al. |
| 2012/0125970 A1 | 5/2012 | Tsui |
| 2012/0167182 A1 | 6/2012 | Rice et al. |
| 2012/0169020 A1 | 7/2012 | Farrell |
| 2012/0305618 A1 | 12/2012 | Tan |
| 2012/0305619 A1 | 12/2012 | Tan |
| 2013/0026120 A1 * | 1/2013 | Johnson ................ A47B 55/02 |
| | | 211/85.5 |
| 2013/0037665 A1 | 2/2013 | Brasell et al. |
| 2013/0048689 A1 | 2/2013 | Ling |
| 2013/0092804 A1 | 4/2013 | Laitila et al. |
| 2013/0134181 A1 | 5/2013 | Helseth et al. |
| 2013/0264242 A1 | 10/2013 | Wojno |
| 2013/0330163 A1 | 12/2013 | Marsh |
| 2014/0048576 A1 | 2/2014 | Tan |
| 2014/0131506 A1 | 5/2014 | Clarkin |
| 2014/0144966 A1 | 5/2014 | Tan |
| 2014/0209651 A1 | 7/2014 | Wilfong |
| 2014/0367507 A1 | 12/2014 | Trampolski |
| 2016/0016752 A1 | 1/2016 | Helseth et al. |
| 2016/0096542 A1 | 4/2016 | Fukushima |
| 2016/0107668 A1 | 4/2016 | Robins |
| 2016/0183744 A1 | 6/2016 | Sadikov et al. |
| 2016/0227969 A1 | 8/2016 | Morris |
| 2016/0242605 A1 | 8/2016 | Heymann et al. |
| 2016/0270607 A1 | 9/2016 | Zeng |
| 2016/0300235 A1 | 10/2016 | Boyle et al. |
| 2016/0311454 A1 | 10/2016 | Hendrick et al. |
| 2016/0367088 A1 | 12/2016 | Allard et al. |
| 2017/0066550 A1 | 3/2017 | Tsai |
| 2017/0172322 A1 | 6/2017 | Bacallao |
| 2017/0174243 A1 | 6/2017 | Bacallao et al. |
| 2017/0197650 A1 | 7/2017 | Whistler |
| 2017/0259959 A1 | 9/2017 | Nilsson et al. |
| 2017/0267412 A1 | 9/2017 | Krause |
| 2017/0275126 A1 | 9/2017 | Sudhir |
| 2017/0325603 A1 | 11/2017 | Bacallao |

FOREIGN PATENT DOCUMENTS

| | | |
|---|---|---|
| AU | 2003272329 | 6/2004 |
| CA | 2789288 A1 | 3/2014 |
| CA | 2958358 A1 | 8/2017 |

(56) References Cited

FOREIGN PATENT DOCUMENTS

| DE | 29806330 U | 7/1998 |
|---|---|---|
| EP | 1182859 A2 | 2/2002 |
| EP | 1510944 A1 | 3/2005 |
| EP | 2387772 A1 | 11/2011 |
| EP | 2438562 A1 | 4/2012 |
| GB | 2547525 A1 | 8/2017 |
| JP | 2000112997 | 4/2000 |
| JP | 2007323453 A | 12/2007 |
| JP | 2008282412 A | 11/2008 |
| WO | 2002029702 | 4/2002 |
| WO | 2004042614 | 5/2004 |
| WO | 2004038997 | 6/2004 |
| WO | 2005094407 | 10/2005 |
| WO | 2006012538 | 2/2006 |
| WO | 2007141417 A1 | 12/2007 |
| WO | 2010083113 | 7/2010 |
| WO | 2011008625 | 1/2011 |
| WO | 2013079878 | 6/2013 |

OTHER PUBLICATIONS

Search Report in GB Patent Application No. GB1713267.1, dated Dec. 22, 2017; 5 pages.
Non-Final Office Action in U.S. Appl. No. 15/653,768, dated Jan. 10, 2018; 31 pages.
Non-Final Office Action in U.S. Appl. No. 15/641,367, dated Jan. 12, 2018; 9 pages.
Non-Final Office Action in U.S. Appl. No. 15/703,307, dated Jan. 18, 2018; 9 pages.
Search Report in UK Patent Application No. GB1621562.6, dated Jun. 14, 2017; 4 pages.
Search Report in UK Patent Application No. GB1621564.2 dated Jun. 15, 2017; 5 pages.
Search Report in UK Patent Application No. GB1702839.0 dated Jun. 14, 2017; 5 pages.
Search Report in United Kingdom Patent Application No. GB1621567.5, dated Jun. 14, 2017; 5 pages.
Notice of Allowance in U.S. Appl. No. 29/572,901, dated May 17, 2017; 9 pages.
"Actionclub Wall Mount Grocery Bag Dispenser Kitchen Plastic Recycle Storage Box Garbage Bag Orangizer Container Holder," AliExpress.com, accessed on Jun. 14, 2017; 3 pages.
"BG001-0111 : Bag Dispenser—Single," BowmanDispensers.com, accessed on Jun. 14, 2017; 8 pages.
"Axis Chrome Over Cabinet Plastic Bag Holder," OrganizeIt.com, accessed on Jun. 14, 2017; 2 pages.
"Simplehuman Stainless Steel Grocery Bag Holder," ContainerStore.com, accessed on Jun. 14, 2017; 2 pages.
"Universal Double Car Vehicle Hangers/Hooks Grocery Bags/Handbags/Umbrellas Organizer—Black," DealsMachine.com, accessed on Oct. 15, 2015; 2 pages.
"Over-the-Door Hook 3 Hook InterDesign," Target.com, accessed on Oct. 15, 2015; 4 pages.
JoshM "Smart Shopping Cart: Bagging Station Design," EECS398SmartShoppingCart.blogspot.in, Mar. 22, 2015; 2 pages.
"Clear Suspended Ceiling Hook," DoItBest.com, accessed on Oct. 14, 2015; 3 pages.
"Industrial T-shirt Bag Stand—Just like Grocery Stores," SmallBizWarehouse.com, accessed on Oct. 14, 2015; 4 pages.

"Dual L-Shape Flash Bracket Holder Mount for Canon Nikon Speedlikte DSLR Camera," Amazon.com, accessed on Janauary 5, 2016; 5 pages.
"InterDesign Classico Over-the-Door Tie and Belt Rack," HoldnStorage.com, accessed on Nov. 22, 2016; 2 pages.
"Small Matte 'So-Hooked' Rack," The Container Store, accessed on Nov. 22, 2016; 2 pages.
"POS Check Out Plastic Bag Holder Dispenser for Retail Supermarket Brand New!" Ebay.com, accessed on Nov. 17, 2016; 5 pages.
"Lot 2 Royston Plastic Grocery Bag Holder Dispenser Stand Point of Sale Shopping," TeraPeak.com, accessed on Nov. 17, 2016; 3 pages.
"Bag Holders," ULINE.mx, accessed on Nov. 17, 2016; 1 page.
"OEM Express Checkout Counter / Customized Supermarket Cash Register Stands Counters," Guangzhou ECO Commercial Equipment Co., Ltd, SupermarketCheckoutCounters.com, accessed on Nov. 17, 2016; 3 pages.
"Retrospec Bicycles Detachable Steel Half-Mesh Apollo Bike Basket with Handles," Retrospec Bicycles, Amazon.com, accessed on Apr. 27, 2017; 1 page.
"Transport trolley / waste / with waste bag holder / 1-bag WASTY 70 LT Francehopital," MedicalExpo.com, accessed on Apr. 25, 2017; 25 pages.
Jackie, "How to Make a Clothespin Bag," TheHappyHousewife.com, Apr. 19, 2012; 14 pages.
"Gluman Combo of 12 Sparkle Clothes Hangers (Yellow) and 6 Plastic Kitchen Storage Containers Blue (125 ml)," PAYtm.com, accessed on Apr. 24, 2017; 3 pages.
"Pack-N-Tote Reusable Grocery Cart Bag, Hooks Directly to the Shopping Cart, Black," Six Mour Creations, Amazon.com, accessed on Apr. 24, 2017; 5 pages.
"Toygully 12 Pack Solid Steel Finish Hangers with Clips strong," PAYtm.com, accessed on Apr. 26, 2017; 3 pages.
Notice of Allowance in U.S. Appl. No. 15/653,768, dated May 2, 2018; 12 pages.
Notice of Allowance in U.S. Appl. No. 15/703,307, dated May 23, 2018; 5 pages.
Non-Final Office Action in U.S. Appl. No. 15/383,151, dated May 25, 2018; 13 pages.
Notice of Allowance in U.S. Appl. No. 15/641,367, dated Jun. 7 2018; 5 pages.
Non-Final Office Action in U.S. Appl. No. 15/383,170, dated Jul. 3, 2018; 10 pages.
Notice of Allowance in U.S. Appl. No. 16/053,248 dated Oct. 11, 2018; 7 pages.
Notice of Allowance in U.S. Appl. No. 15/383,170 dated Dec. 6, 2018; 5 pages.
Notice of Allowance in U.S. Appl. No. 15/383,151 dated Dec. 21, 2018; 9 pages.
Timmerman, J.D. "Bag Holder," U.S. Pat. No. 477,235, dated Jun. 21, 1892.
Restriction Requirement in U.S. Appl. No. 15/433,365 dated Dec. 31, 2019; 5 pages.
Non-Final Office Action in U.S. Appl. No. 15/433,388 dated Dec. 31, 2019; 6 pages.
Non-Final Office Action in U.S. Appl. No. 15/433,365 dated Feb. 5, 2019; 8 pages.
Non-Final Office Action in U.S. Appl. No. 15/676,218 dated Feb. 22, 2019; 12 pages.

* cited by examiner

SHOPPING CART BAGGING STATION AND METHOD OF FORMING THE SAME

CROSS REFERENCE TO RELATED APPLICATIONS

This invention claims priority to U.S. provisional patent application Ser. No. 62/270,785, filed Dec. 22, 2015 to Applicant Wal-Mart Stores Inc., and entitled "Shopping Cart Bagging Station and Method of Forming the Same", U.S. provisional patent application Ser. No. 62/270,813, filed Dec. 22, 2015 to Applicant Wal-Mart Stores Inc., and entitled "Shopping Cart Bagging Station and Method of Forming the Same", U.S. provisional patent application Ser. No. 62/270,827, filed Dec. 22, 2015 to Applicant Wal-Mart Stores Inc., and entitled "Shopping Cart Bagging Station and Method of Forming the Same", U.S. provisional patent application Ser. No. 62/298,011, filed Feb. 22, 2016 to Applicant Wal-Mart Stores Inc., and entitled "Shopping Cart Bagging Station and Method of Forming the Same", U.S. provisional patent application Ser. No. 62/298,017, filed Feb. 22, 2016 to Applicant Wal-Mart Stores Inc., and entitled "Shopping Cart Bagging Station and Method of Forming the Same", U.S. provisional patent application Ser. No. 62/377,135, filed Aug. 19, 2016 to Applicant Wal-Mart Stores Inc., and entitled "Shopping Cart Bagging Station and Method of Forming the Same", U.S. provisional patent application Ser. No. 62/377,143, filed Aug. 19, 2016 to Applicant Wal-Mart Stores Inc., and entitled "Shopping Cart Bagging Station and Method of Forming the Same", and U.S. provisional patent application Ser. No. 62/402,475, filed Sep. 30, 2016 to Applicant Wal-Mart Stores Inc., and entitled "Shopping Cart Bagging Station and Method of Forming the Same", which are included entirely herein by reference.

BACKGROUND OF THE INVENTION

Technical Field

This invention relates to retail store fixtures, and, more specifically, to a bagging station that couples to a shopping cart.

State of the Art

A bagging station is a fixture located in a retail store that holds a stack of shopping bags, often plastic shopping bags, and dispenses these bags as they are filled with products a customer has purchased. The shopping bags are held in a manner and position such that it is easy and convenient for a person to open one bag at a time, place purchased items in the bag, and then remove the bag and the enclosed products from the bagging station. Bagging stations have traditionally been located at checkout stations where customers pay for their products, because that is where the products have traditionally been transferred from a shopping cart to the shopping bags. With the advent of electronic purchasing and self-checkout, however, customers are now able to pay for and bag their products as they shop, and these actions can occur at locations besides checkout stations. There is a need for bagging stations in locations in retail stores besides at the checkout station.

Accordingly, what is needed is a bagging station that can be mounted in a shopping cart, so that customers can bag their purchases as they shop.

DETAILED DESCRIPTION OF EMBODIMENTS OF THE INVENTION

Disclosed herein are embodiments of an invention related to retail store fixtures, and, more specifically, to a bagging station that couples to a shopping cart. The disclosed shopping cart bagging station can be used by customers to bag their purchases as they shop. The disclosed shopping cart bagging station includes a bag dispenser portion and a first and a second mounting clip. The bag dispenser portion holds at least one shopping bag, and dispenses the shopping bags one at a time as products are placed in a shopping bag. The first and the second mounting clip are coupled to the bag dispenser portion and couple the shopping cart bagging station to a shopping cart. In some embodiments, the bag dispenser portion includes a support bar. In some embodiments, a bag holder hook is coupled to the support bar, where the bag holder hook holds at least one shopping bag. In some embodiments, a first and a second shopping bag handle hook are coupled to the support bar, where each of the first and the second shopping bag handle hooks hold a handle of a shopping bag so the shopping bag is held open and items can be placed in the shopping bag. The shopping cart bagging station can be mounted in various locations on a shopping cart, making it easy and convenient for a customer to carry and load one or more shopping bags as they shop. The shopping cart bagging station can be provided by the retail store for customer use, much like the use of the shopping cart. Or, in some embodiments, the shopping cart bagging station is brought into the store by the customer. The disclosed shopping cart bagging station provides a means for a customer to load purchases into bags as they shop, instead of having to bag their purchases at a checkout station.

Disclosed herein is a shopping cart bagging station that includes a means to dispense shopping bags, and a means to couple the means to dispense shopping bags to a shopping cart. In some embodiments, the means to couple the means to dispense shopping bags to the shopping cart includes a means to couple the means to dispense shopping bags to a first rod of the shopping cart. In some embodiments, the means to couple the bag dispenser portion to the shopping cart includes a means to couple the means to dispense shopping bags to a second rod of the shopping cart. The means to dispense shopping bags and the means to couple the means to dispense shopping bags to a shopping cart can take many different forms, some examples of which are shown and described in this document. The examples shown and described are not meant to be limiting, and many other variations are possible in light of the teachings in this document.

Figure 1:
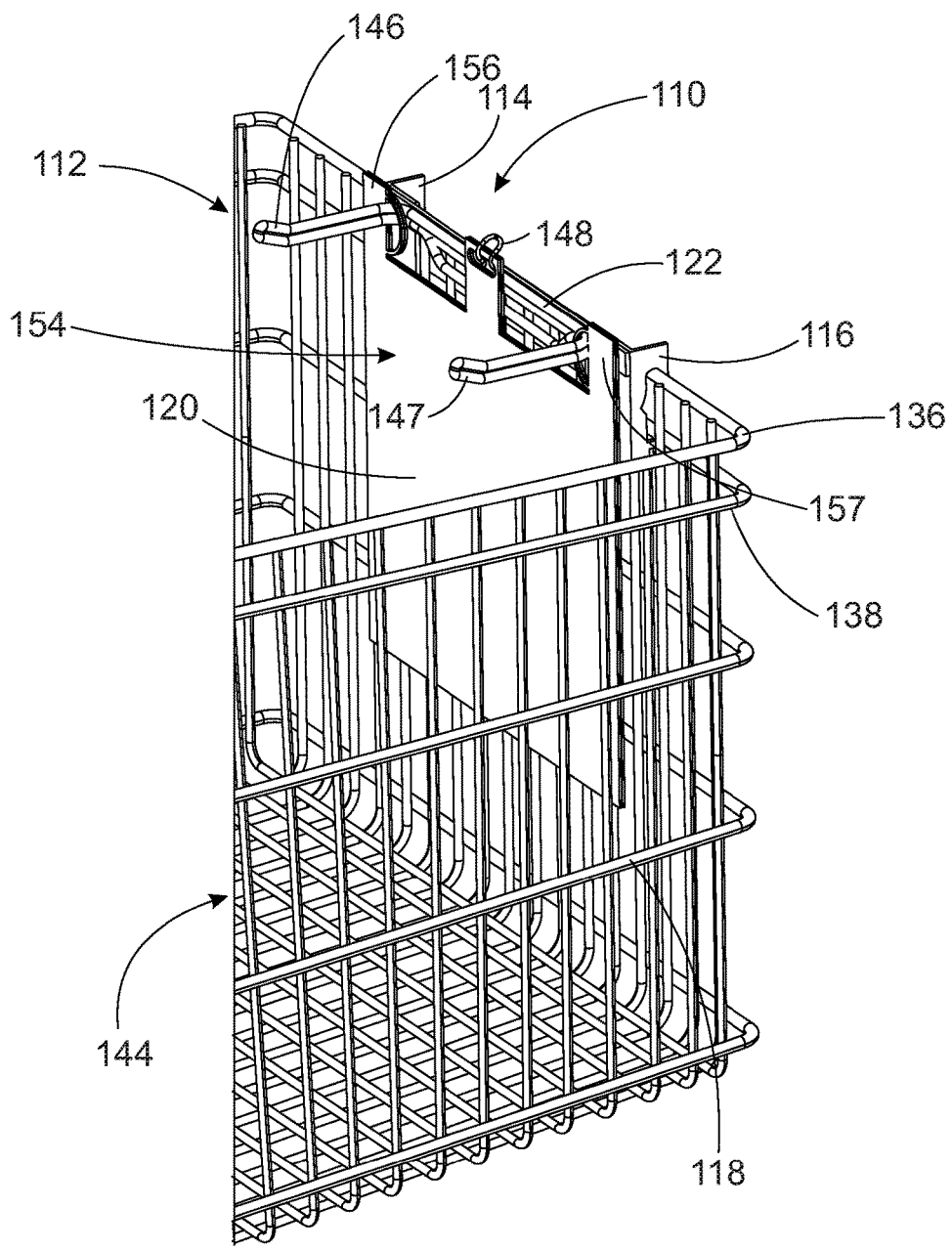
FIG. 1 shows a shopping cart bagging station coupled to a shopping cart.
Figure 2:
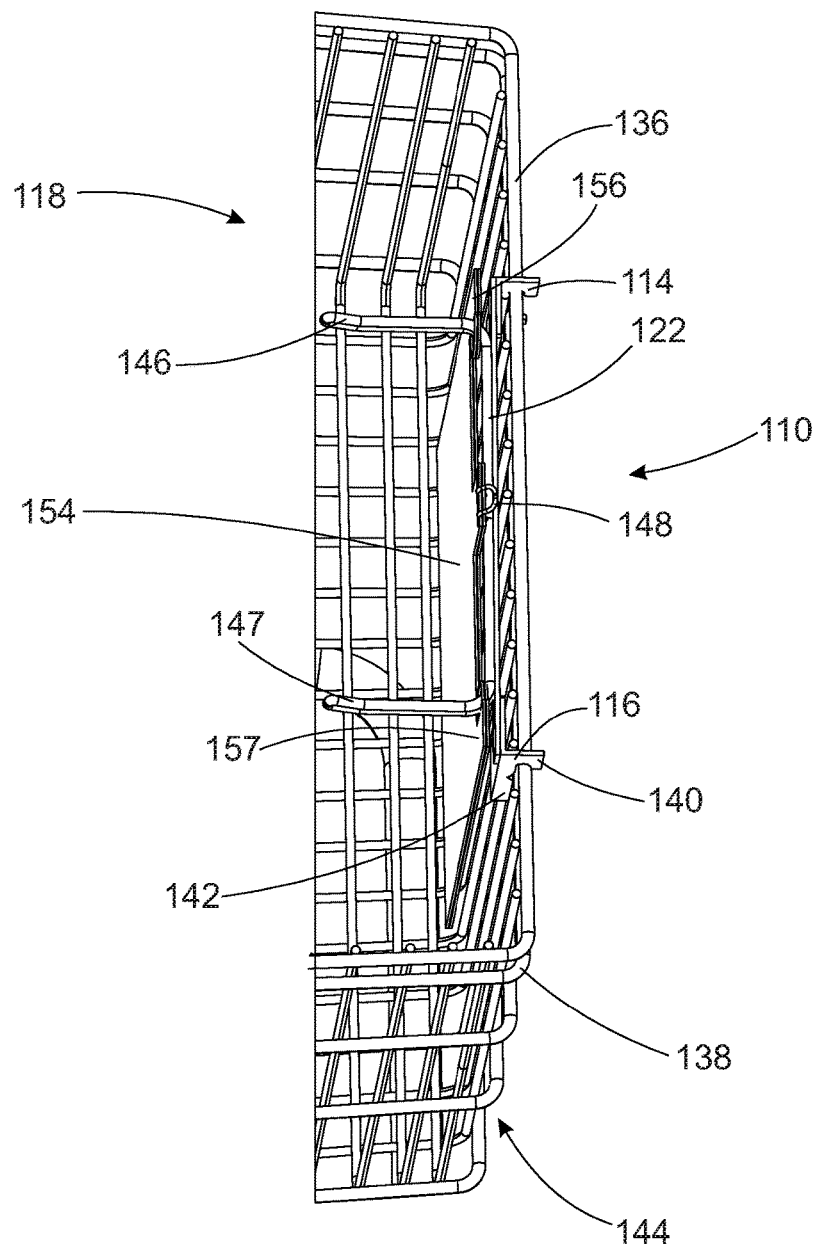
FIG. 2 shows a top perspective view of the shopping cart bagging station of FIG. 1 coupled to a shopping cart.
Figure 3:
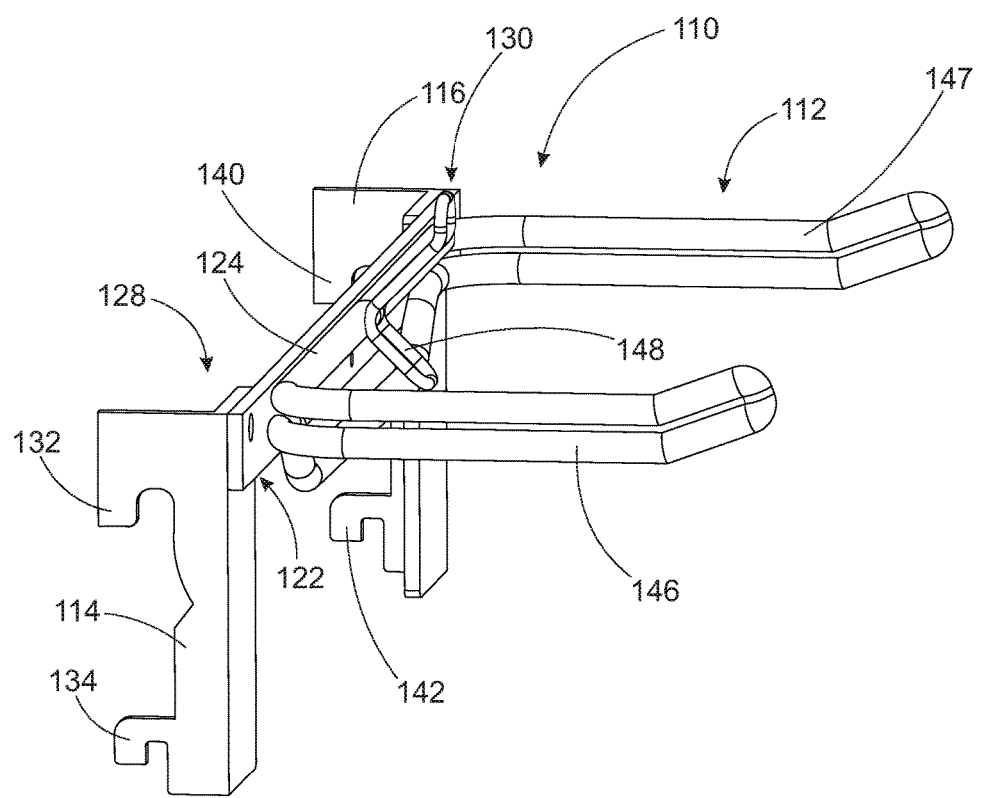
FIG. 3 is a side perspective view of the shopping cart bagging station of FIG. 1.
Figure 4:
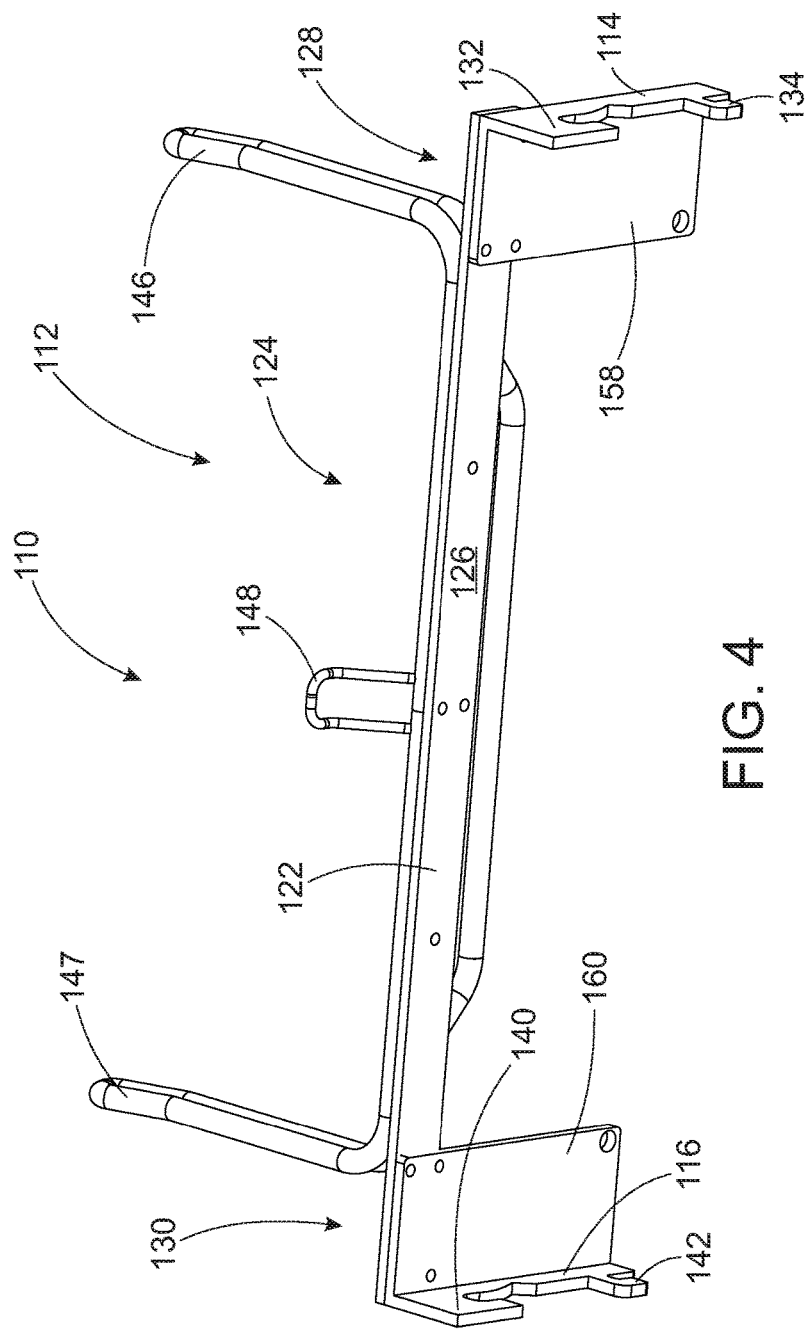
FIG. 4 is a rear view of the shopping cart bagging station of FIG. 1.

FIG. 1 through FIG. 4 show an embodiment of a shopping cart bagging station 110. FIG. 1 shows shopping cart bagging station 110 coupled to a shopping cart 118, with a plurality of shopping bags 154 being held by shopping cart bagging station 110. FIG. 2 shows a top perspective view of shopping cart bagging station 110 coupled to shopping cart 118. FIG. 3 shows a side perspective view of shopping cart bagging station 110. FIG. 4 shows a rear perspective view of shopping cart bagging station 110.

Shopping cart bagging station 110 includes a bag dispenser portion 112, as shown in FIG. 1 through FIG. 4. In the embodiment shown in FIG. 1 through FIG. 4, bag dispenser portion 112 is the means to dispense shopping bags, but this is not meant to be limiting. The means to dispense shopping bags can take many other forms.

Bag dispenser portion 112 holds and dispenses at least one shopping bag. In the embodiment shown in the figures, bag dispenser portion 112 holds and dispenses plurality of shopping bags 154 as shown in FIG. 1. Bag dispenser portion 112 includes a support bar 122, and a pair of bag holder arms 146 and 147. Support bar 122 includes a front side 124, a rear side 126, a first end 128, and a second end 130 opposing first end 128, see FIG. 3 and FIG. 4. Bag holder arms 146 and 147 are coupled to and extend from front side 124 of support bar 122.

Bag dispenser portion 112 also includes a bag holder hook 148 that holds plurality of shopping bags 154, as shown in FIG. 1. Bag holder hook 148 holds at least one shopping bag, with bag holder arms 146 and 147 holding handles 156 and 157 of plurality of shopping bags 154 (see FIG. 1 and FIG. 2). When a user wishes to fill a first bag of plurality of shopping bags 154, for example, a bag 120 as shown in FIG. 1, bag 120 is pulled out away from support bar 122, with handles 156 and 157 sliding along bag holder arms 146 and 147, respectively, until shopping bag 120 is open and ready to receive items. Bag holder arms 146 and 147 support bag 120 and the items placed in bag 120. Once the user is done filling bag 120, bag 120 is removed from shopping cart bagging station 110 and the process is repeated with a next one of plurality of shopping bags 154.

Shopping cart bagging station 110 also includes a first and a second mounting clip 114 and 116, as shown in FIG. 1 through FIG. 4. In this embodiment, first and second mounting clip 114 and 116 are the means to couple the means to dispense shopping bags (bag dispenser 112) to a shopping cart. First and second mounting clip 114 and 116 couple to shopping cart 118, which couples bag dispenser portion 112 and shopping cart bagging station 110 to shopping cart 118. In the embodiment shown, first mounting clip 114 couples to rear side 126 of support bar 122 at first end 128, and second mounting clip 116 couples to rear side 126 at second end 130, as can best be seen in FIG. 3 and FIG. 4.

In the specific embodiment of support bar 122 shown in FIG. 1 through FIG. 4, first mounting clip 114 includes a first end plate 158. First end plate 158 is coupled to rear side 126 of first end 128 of support bar 122, as shown in FIG. 4. Second mounting clip 116 includes a second end plate 160. Second end plate 160 is coupled to rear side 126 of second end 130 of support bar 122.

First and second mounting clip 114 and 116 in this embodiment each include a pair of mounting clip hooks, as can best be seen in FIG. 3 and FIG. 4. First mounting clip 114 includes first mounting clip hook 132 and second mounting clip hook 134. First mounting clip 114 is formed by coupling first mounting clip hook 132 to second mounting clip hook 134 in this embodiment. In some embodiments, first mounting clip hook 132 and second mounting clip hook 134 are formed from a single piece of rigid material such as metal, wood, or plastic. First and second mounting clip hook 132 and 134 removeably couple to one of a plurality of rods 144 of shopping cart 118.

Second mounting clip 116 includes third mounting clip hook 140 and fourth mounting clip hook 142, as can best be seen in FIG. 4. Second mounting clip 116 is formed by coupling third mounting clip hook 140 to fourth mounting clip hook 142 in this embodiment. In some embodiments, third mounting clip hook 140 and fourth mounting clip hook 142 are formed from a single piece of rigid material such as metal, wood, or plastic. Third and fourth mounting clip hook 140 and 142 removeably couple to one of a plurality of rods 144 of shopping cart 118, as can be seen in FIG. 1 and FIG. 2.

In the embodiment shown in the figures, first and third mounting clip hook 132 and 140 couple to a first rod 136 (FIG. 1) of plurality of rods 144. Second mounting clip hook 134 and fourth mounting clip hook 142 each couple to a second rod 138 (FIG. 1) of plurality of rods 144 of shopping cart 118. In this embodiment, first and third mounting clip hook 132 and 140 are the means to couple the means to dispense shopping bags to a first rod of the shopping cart. Second mounting clip hook 134 and fourth mounting clip hook 140 are the means to couple the means to dispense shopping bags to a second rod of the shopping cart.

It is to be understood that first and second mounting clip 114 and 116 can take many different forms. Any form that provides for first and second mounting clip 114 and 116 to couple to shopping cart 118 can be used. It is also to be understood that first, second, third and fourth mounting clip hook 132, 134, 140, and 142 can take many different forms, when they are used. First, second, third and fourth mounting clip hook 132, 134, 140, and 142 can be designed and made to couple to any rod or part of shopping cart 118.

With first and second mounting clip 114 and 116 coupling bag dispenser portion 112 to shopping cart 118, shopping cart bagging station 110 is coupled to shopping cart 118 and can be used by a customer to dispense bags as needed while the customer shops. Shopping cart bagging station 110 can be coupled to many different locations on shopping cart 118. FIG. 1 and FIG. 2 show shopping cart bagging station 110 coupled to an interior end of shopping cart 118, but this is not mean to be limiting. Shopping cart bagging station 110 can be coupled to the interior or exterior of shopping cart 118. Shopping cart bagging station 110 can be coupled to the front, sides, rear, edges, or bottom of shopping cart 118. In some embodiments, the shopping cart will take a form other than shopping cart 118, and the means to couple bagging station 110 to the shopping cart will take another form consistent with the form of the shopping cart.

Figure 5:
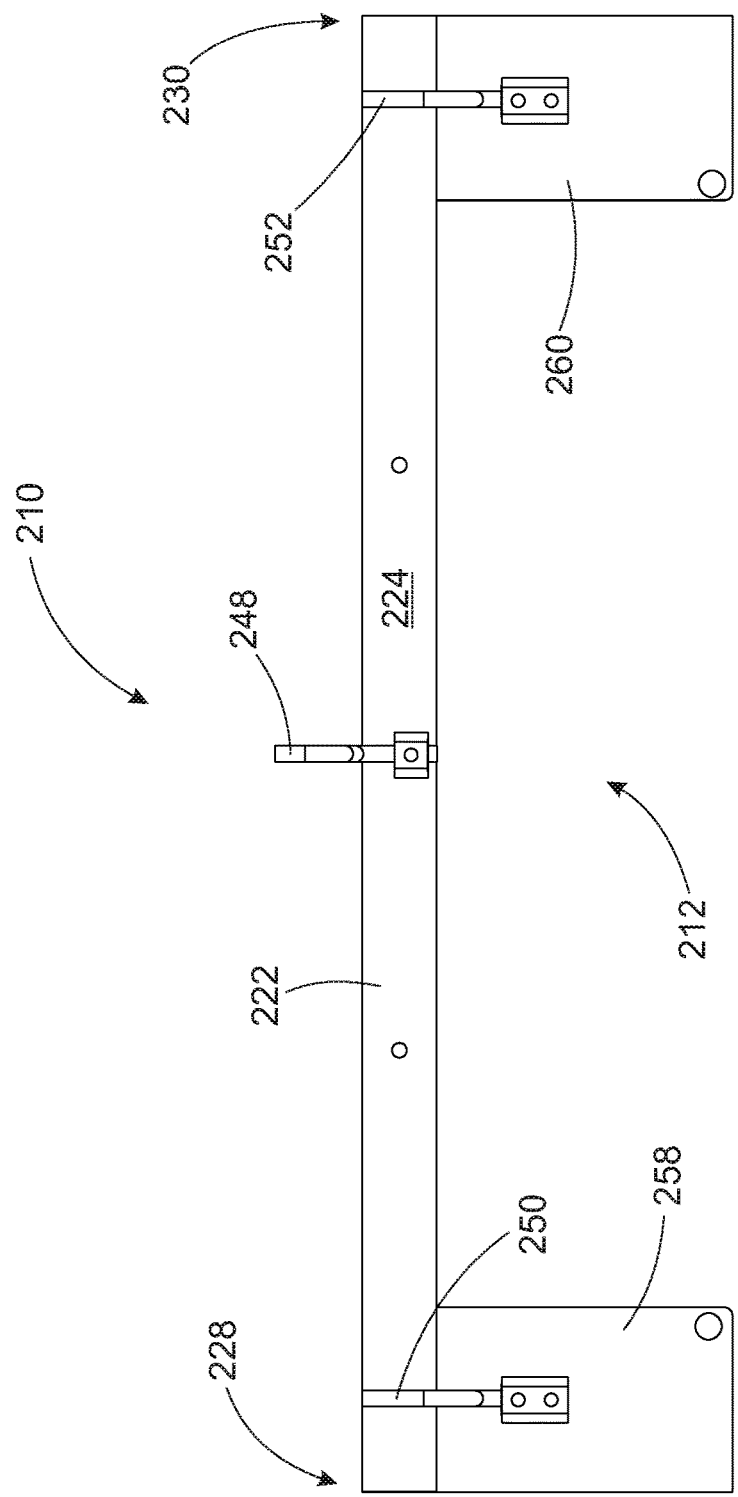
FIG. 5 shows a front view of a further embodiment of a shopping cart bagging station.
Figure 6:
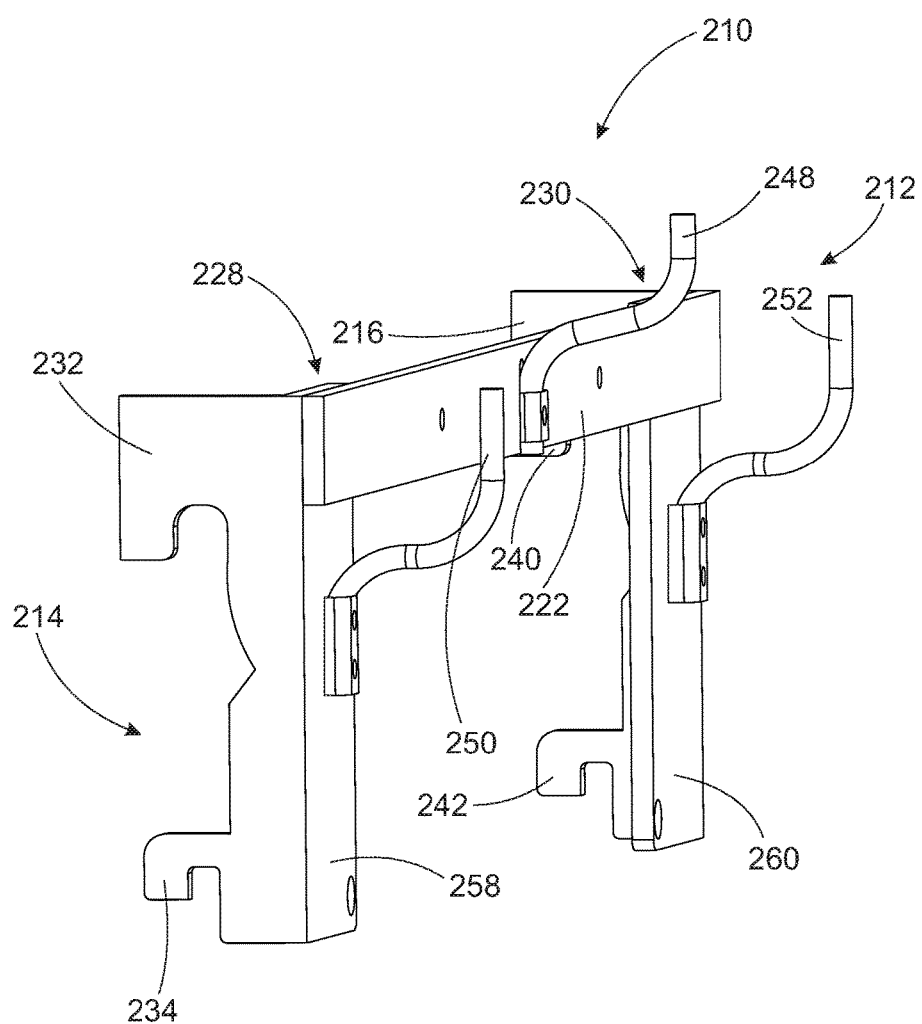
FIG. 6 shows a side perspective view of the shopping cart bagging station of FIG. 5.

FIG. 5 and FIG. 6 show an embodiment of a shopping cart bagging station 210. Shopping cart bagging station 210 couples to a shopping cart, and holds and dispenses at least one shopping bag, as described for shopping cart bagging station 110 above. Shopping cart bagging station 210 includes similar elements to shopping cart bagging station 110, with similar numbers indicating similar elements to shopping cart bagging station 110.

Shopping cart bagging station 210 includes a bag dispenser portion 212, as shown in FIG. 5 and FIG. 6. In this embodiment, bag dispenser portion 212 is the means to dispense shopping bags, but this is not meant to be limiting. The means to dispense shopping bags can take many other forms.

Bag dispenser portion 212 holds and dispenses a plurality of shopping bags, similar to bag dispenser portion 112 described above. Bag dispenser portion 212 includes a support bar 222. Support bar 222 includes a front side 224

(FIG. 5), a rear side (not shown) opposing front side 224, a first end 228 and a second end 230 opposing first end 228.

Bag dispenser portion 212 also includes a bag holder hook 248 that holds at least one shopping bag. Bag holder hook 248 is coupled to support bar 222 about halfway between first end 228 and second end 230 in this embodiment. Bag holder hook 248 holds at least one shopping bag, similar to bag holder hook 148 shown in FIG. 1 and FIG. 2 and described above.

Bag dispenser portion 212 also includes a first shopping bag handle hook 250, a second shopping bag handle hook 252, a first end plate 258 and a second end plate 260. First shopping bag handle hook is coupled to first end plate 258. First end plate 258 is coupled to support bar 222 at first end 228. Second shopping bag handle hook 252 is coupled to second end plate 260. Second end plate 260 is coupled to support bar 222 at second end 230.

Bag holder hook 248 holds one or more shopping bags. First and second shopping bag handle hooks 250 and 252 each hold a handle of one or more shopping bag, as shown for shopping cart bagging station 110 in FIG. 1 and FIG. 2. When a user wishes to fill one of the at least one shopping bag hung from bag holder hook 248, the bag is pulled open and items placed in the bag, with first and second shopping bag handle hooks 250 and 252 supporting the bag and the items in the bag. Once the user is done filling the bag, it is removed from shopping cart bagging station 210 and the process is repeated with a next bag of the plurality of shopping bags hung from bag holder hook 248.

Shopping cart bagging station 210 also includes a first and a second mounting clip 214 and 216, as shown in FIG. 6. In this embodiment, first and second mounting clip 214 and 216 are the means to couple the means to dispense shopping bags to a shopping cart. First and second mounting clip 214 and 216 couple to a shopping cart such as shopping cart 118 shown in FIG. 1. Coupling first and second mounting clip 214 and 216 to a shopping cart couples bag dispenser portion 212 and shopping cart bagging station 210 to the shopping cart. In the embodiment shown, first mounting clip 214 couples to the rear side of support bar 222 at first end 228 (FIG. 6), and second mounting clip 216 couples to the rear side of support bar 222 at second end 230 (FIG. 6).

In the embodiment of shopping cart bagging station 210 shown in FIG. 5 and FIG. 6, first end plate 258 is coupled to the rear side of first end 228 of support bar 222, with first mounting clip 214 coupled to first end plate 258 (FIG. 6). Second end plate 260 is coupled to the rear side of second end 230 of support bar 222, with second mounting clip 216 coupled to second end plate 260.

First and second mounting clip 214 and 216 in this embodiment each include a pair of mounting clip hooks, as can best be seen in FIG. 6. First mounting clip 214 includes a first mounting clip hook 232 and a second mounting clip hook 234. First mounting clip 214 is formed by coupling first mounting clip hook 232 to second mounting clip hook 234 in some embodiments. In this embodiment, first mounting clip hook 232 and second mounting clip hook 234 are formed from a single piece of metal to form first mounting clip 214, but this is not meant to be limiting. First mounting clip 214 can be formed of any rigid material such as metal, wood, or plastic. First and second hook mounting clip 232 and 234 removeably couple to one of a plurality of rods of the shopping cart, similar to how clip 114 is coupled to shopping cart 118 in FIG. 2.

Second mounting clip 216 includes a third mounting clip hook 240 and a fourth mounting clip hook 242, similar to first mounting clip 214. Second mounting clip 216 is formed by coupling third mounting clip hook 240 to second mounting clip hook 242 in some embodiments. In this embodiment, third mounting clip hook 240 and fourth mounting clip hook 242 are formed from a single piece of metal to form second mounting clip 216. Second mounting clip 216 can be formed of any rigid material such as metal, wood, or plastic. Third mounting clip hook 240 and fourth mounting clip hook 242 each removeably couple to one of the plurality of rods of a shopping cart.

In the embodiment shown in the figures, first mounting clip hook 232 and third mounting clip hook 240 couple to a first rod of the plurality of rods of a shopping cart, similar to shopping cart bagging station 110 shown in FIG. 1. Second mounting clip hook 234 and fourth mounting clip hook 242 each couple to a second rod of the plurality of rods of the shopping cart. In this embodiment, first mounting clip hook 232 and third mounting clip hook 240 are the means to couple the means to dispense shopping bags to a first rod of the shopping cart. Second mounting clip hook 234 and fourth mounting clip hook 240 are the means to couple the means to dispense shopping bags to a second rod of the shopping cart.

It is to be understood that first and second mounting clip 214 and 216 can take many different forms. Any form that couples first and second mounting clip 214 and 216 to a shopping cart can be used. It is also to be understood that first mounting clip hook 232, second mounting clip hook 234, third mounting clip hook 240 and fourth mounting clip hook 242 can take many different forms, when they are used. First mounting clip hook 232, second mounting clip hook 234, third mounting clip hook 240 and fourth mounting clip hook 242 can be designed and made to couple to any rod or part of a shopping cart.

With first and second mounting clip 214 and 216 coupling bag dispenser portion 212 to a shopping cart, shopping cart bagging station 210 is coupled to the shopping cart, and can be used by a customer to dispense bags as needed while the customer shops. Shopping cart bagging station 210 can be coupled to any location of a shopping cart. Shopping cart bagging station 210 can be coupled to the interior or the exterior of a shopping cart. Shopping cart bagging station 210 can be coupled to the front, sides, rear, edges, or bottom of the shopping cart. The means to couple bagging station 210 to the shopping cart will often take different forms, consistent with the form of the shopping cart.

Figure 7:
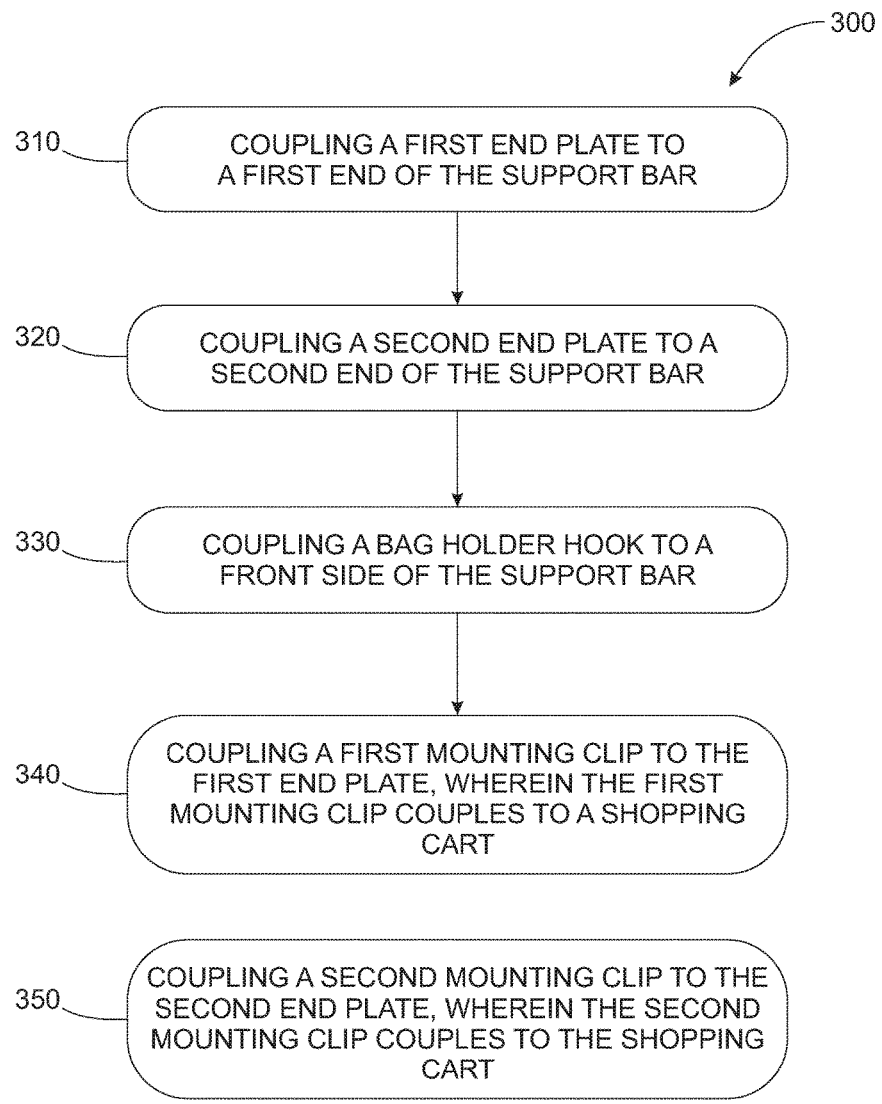
FIG. 7 illustrates a method 300 of forming a shopping cart bagging station.

FIG. 7 illustrates a method 300 of forming a shopping cart bagging station having a support bar. Method 300 includes an act 310 of coupling a first end plate to a first end of the support bar. Method 300 also includes an act 320 of coupling a second end plate to a second end of the support bar. Method 300 includes an act 330 of coupling a bag holder hook to a front side of the support bar. The bag holder hook holds at least one shopping bag. Method 300 includes an act 340 of coupling a first mounting clip to the first end plate, where the first mounting clip couples to a shopping cart, and an act 350 of coupling a second mounting clip to the second end plate, where the second mounting clip couples to the shopping cart. Method 300 can include many other acts.

In some embodiments, act 330 of coupling the bag holder hook to a front side of the support bar includes coupling the bag holder hook to a front side of the support bar about halfway between the first end and the second end of the support bar.

In some embodiments, method 300 includes coupling a first mounting clip hook to a second mounting clip hook to form the first mounting clip, where the first and the second mounting clip hook couple to a rod of a shopping cart. In some embodiments, method 300 includes coupling a first and a second shopping bag handle hook to the support bar, where the first and the second shopping bag handle hook each hold a handle of at least one shopping bag.

In some embodiments, method 300 includes coupling the first shopping bag handle hook to the first end plate. In some embodiments, method 300 includes coupling the second shopping bag handle hook to the second end plate.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A shopping cart bagging station comprising:
   a bag dispenser portion, wherein the bag dispenser portion holds at least one shopping bag, and wherein the bag dispenser portion comprises:
   a support bar with a front side, a rear side, a first end and a second end;
   a first end plate coupled to the rear side at the first end, wherein a first mounting clip is coupled to the first end plate;
   a second end plate coupled to the rear side at the second end, wherein a second mounting clip is coupled to the second end plate;
   a bag holder hook coupled to the support bar about halfway between the first end and the second end;
   a first shopping bag handle hook coupled to the first end plate; and
   a second shopping bag handle hook coupled to the second end plate.

2. The shopping cart bagging station of claim 1, wherein:
   the first mounting clip comprises a first and a second hook formed from a single piece of rigid material;
   each of the first and the second hook removeably couple to at least one of a plurality of shopping cart rods of the shopping cart;
   the second mounting clip comprises a third and a fourth mounting clip hook formed of a single piece of rigid material; and
   each of the third and the fourth mounting clip hook removeably couple to at least one of the plurality of shopping cart rods of the shopping cart.

3. The shopping cart bagging station of claim 2, wherein the first and the third mounting clip hook couple to a first rod of the plurality of shopping cart rods, and wherein the second and the fourth mounting clip hook couple to a second rod of the plurality of shopping cart rods.

4. The shopping cart bagging station of claim 1, wherein the bag holder hook holds the at least one shopping bag, and the first and the second shopping bag handle hooks each hold a handle of the at least one shopping bag.

5. The shopping cart bagging station of claim 4, wherein:
   the first mounting clip comprises a first and a second mounting clip hook formed of a single piece of rigid material;
   each of the first and the second mounting clip hook removeably couple to at least one of a plurality of shopping cart rods of a shopping cart;
   the second mounting clip comprises a third and a fourth mounting clip hook formed of a single piece of rigid material;
   each of the third and the fourth mounting clip hook removeably couple to at least one of the plurality of shopping cart rods of the shopping cart.

6. The shopping cart bagging station of claim 5, wherein the first and the third mounting clip hook couple to a first rod of the plurality of shopping cart rods, and wherein the second and the fourth mounting clip hook couple to a second rod of the plurality of shopping cart rods.

7. A method of forming a shopping cart bagging station having a support bar, wherein the method comprises:
   coupling a first end plate to a rear side of the support bar at a first end of the support bar;
   coupling a second end plate to the rear side of the support bar at a second end of the support bar;
   coupling a bag holder hook to a front side of the support bar;
   coupling a first mounting clip to the first end plate, wherein the first mounting clip couples to a shopping cart; and
   coupling a second mounting clip to the second end plate, wherein the second mounting clip couples to the shopping cart.

8. The method of claim 7, further comprising coupling a first mounting clip hook to a second mounting clip hook to form the first mounting clip, wherein the first and the second mounting clip hook couple to a rod of a shopping cart.

9. The method of claim 7, wherein the bag holder hook holds at least one shopping bag.

10. The method of claim 7, further comprising coupling a first and a second shopping bag handle hook to the support bar, wherein the first and the second shopping bag handle hook each hold a handle of at least one shopping bag.

11. The method of claim 10, wherein coupling the bag holder hook to a front side of the support bar comprises coupling the bag holder hook to a front side of the support bar about halfway between the first end and the second end of the support bar.

12. The method of claim 11, further comprising:
   coupling the first shopping bag handle hook to the first end plate; and
   coupling the second shopping bag handle hook to the second end plate.

* * * * *